(12) United States Patent
Tanner et al.

(10) Patent No.: US 8,775,310 B2
(45) Date of Patent: Jul. 8, 2014

(54) METHOD, APPARATUS, AND COMPUTER PROGRAM PRODUCT FOR ALLOWING PAYMENT CARDS ISSUED FOR ONLY LIMITED DURATION USE TO BE REUSED MULTIPLE TIMES TO REDUCE THE OVERALL COST OF ISSUANCE

(75) Inventors: Colin Tanner, Middlesex (GB); Lukas Ekselius, Overijse (BE)

(73) Assignee: Mastercard International Incorporated Purchase NY (US)

( * ) Notice: Subject to any disclaimer, the term of this patent is extended or adjusted under 35 U.S.C. 154(b) by 100 days.

(21) Appl. No.: 12/826,989

(22) Filed: Jun. 30, 2010

(65) Prior Publication Data

US 2010/0332387 A1 Dec. 30, 2010

Related U.S. Application Data

(60) Provisional application No. 61/221,802, filed on Jun. 30, 2009.

(51) Int. Cl.
*G06Q 40/00* (2012.01)
*G06Q 20/10* (2012.01)
*G06Q 20/28* (2012.01)
*G06Q 20/40* (2012.01)

(52) U.S. Cl.
CPC .............. *G06Q 40/00* (2013.01); *G06Q 20/105* (2013.01); *G06Q 20/28* (2013.01); *G06Q 20/40* (2013.01)
USPC ................. 705/41; 705/35; 235/380

(58) Field of Classification Search
CPC ..... G06Q 40/00; G06Q 20/105; G06Q 20/28; G06Q 20/40
USPC ........................ 705/41, 35; 235/380
See application file for complete search history.

(56) References Cited

U.S. PATENT DOCUMENTS

| | | | |
|---|---|---|---|
| 4,149,394 A | | 4/1979 | Sornes |
| 5,206,488 A * | | 4/1993 | Teicher ................. 235/380 |
| 5,566,327 A * | | 10/1996 | Sehr ........................ 1/1 |
| 6,874,685 B1 * | | 4/2005 | Moreau et al. ......... 235/384 |
| 7,959,076 B1 * | | 6/2011 | Hopkins, III .......... 235/380 |
| 8,082,195 B2 * | | 12/2011 | Enzaldo ................. 705/30 |
| 8,245,959 B1 * | | 8/2012 | Black et al. ............ 241/30 |
| 2001/0032878 A1 * | | 10/2001 | Tsiounis et al. ........ 235/379 |
| 2002/0069118 A1 * | | 6/2002 | Zylstra .................. 705/26 |
| 2002/0116235 A1 * | | 8/2002 | Grimm et al. .......... 705/5 |
| 2004/0193541 A1 * | | 9/2004 | Lasater et al. .......... 705/39 |

(Continued)

OTHER PUBLICATIONS

The end of Privacy? (Jun. 2006). Consumer Reports, 71, 33-39. Retrieved Feb. 14, 2014.*
Metro in Brief. (May 19, 1999). The Washington Post. Retrieved Feb. 14, 2014.*

(Continued)

*Primary Examiner* — Kito R Robinson
(74) *Attorney, Agent, or Firm* — Otterstedt, Ellenbogen & Kammer, LLP

(57) ABSTRACT

A recyclable contactless payment device is issued to a first patron of a venue. Use of the contactless payment device at the venue by the first patron is facilitated, as is return of the contactless payment device by the first patron for recycling. The contactless payment device is deactivated and stored. The issuing and facilitation of use are repeated for at least a second patron of the venue, with the same recyclable contactless payment device.

22 Claims, 5 Drawing Sheets

(56) References Cited

U.S. PATENT DOCUMENTS

| | | | |
|---|---|---|---|
| 2005/0239542 A1* | 10/2005 | Olsen | 463/27 |
| 2005/0251446 A1* | 11/2005 | Jiang et al. | 705/14 |
| 2006/0208065 A1* | 9/2006 | Mendelovich et al. | 235/380 |
| 2009/0111562 A1* | 4/2009 | Chudd et al. | 463/20 |
| 2010/0036524 A1* | 2/2010 | Chirco | 700/237 |
| 2010/0205050 A1* | 8/2010 | Wolfe et al. | 705/14.15 |
| 2011/0087537 A1* | 4/2011 | Hanafi et al. | 705/14.34 |

OTHER PUBLICATIONS

Coyle-Camp, E. (1994). Savings in the cards. Facilities, 12(8), 5. Retrieved Feb. 14, 2014.*

Wikipedia, Keycard lock, downloaded from http://en.wikipedia.org/wiki/Key_card[Jul. 9, 2012 3:18:51 PM].

Wikipedia, Stored-value card, re-directed from Transit Card, downloaded from http://en.wikipedia.org/wiki/Transit_card [Jul. 9, 2012 3:21:22 PM].

* cited by examiner

METHOD, APPARATUS, AND COMPUTER PROGRAM PRODUCT FOR ALLOWING PAYMENT CARDS ISSUED FOR ONLY LIMITED DURATION USE TO BE REUSED MULTIPLE TIMES TO REDUCE THE OVERALL COST OF ISSUANCE

CROSS-REFERENCE TO RELATED APPLICATIONS

This patent application claims the benefit of U.S. Provisional Patent Application Ser. No. 61/221,802 filed on Jun. 30, 2009 and entitled "Method, Apparatus, and Computer Program Product for Allowing Payment Cards Issued for Only Limited Duration Use to be Reused Multiple Times to Reduce the Overall Cost of Issuance." The complete disclosure of the aforementioned Provisional Patent Application Ser. No. 61/221,802 is expressly incorporated herein by reference in its entirety for all purposes.

FIELD OF THE INVENTION

The present invention relates generally to electronic commerce, and, more particularly, to electronic payment systems.

BACKGROUND OF THE INVENTION

There is an interest in employing cash alternatives in a variety of environments. Such cash alternatives can include, for example, payment devices such as chip-based payment cards and the like.

SUMMARY OF THE INVENTION

Principles of the present invention provide techniques for allowing payment cards issued for only limited duration use to be reused multiple times to reduce the overall cost of issuance.

In one aspect, an exemplary method includes issuing a recyclable contactless payment device to a first patron of a venue; facilitating the first patron using the contactless payment device at the venue; facilitating the first patron returning the contactless payment device for recycling; deactivating and storing the contactless payment device; and repeating the issuing and facilitating using steps at least a second patron of the venue, with the recyclable contactless payment device.

In another aspect, an exemplary apparatus includes a memory; a network interface; at least one processor, coupled to the memory and the network interface; and a plurality of distinct software modules embodied on at least one tangible computer readable recordable storage medium. The modules include a return detection module, a refund module, a balance and preference database module, and a deactivation module. The distinct software modules, when loaded into the memory, cause the at least one processor to be operative to store first user preference information in the balance and preference database module. The first user preference information is associated with a recyclable contactless payment device issued to a first patron of a venue. The distinct software modules, when loaded into the memory, also cause the at least one processor to be operative, after the first patron has used the contactless payment device at the venue, to detect, by executing the return detection module and by communication over the network interface, that the first patron has returned the recyclable contactless payment device for recycling and that the recyclable contactless payment device returned for recycling by the first patron is genuine. The distinct software modules, when loaded into the memory, further cause the at least one processor to be operative to detect, by executing the refund module interfacing with the balance and preference database module, that a remaining balance exists and is to be disposed of in accordance with the first user preference information; to deactivate the recyclable contactless payment device by executing the deactivation module; to dispose of the remaining balance of the recyclable contactless payment device in accordance with the preference information by executing the refund module; and to store second user preference information in the balance and preference database module. The second user preference information is associated with the recyclable contactless payment device in connection with issue of the recyclable contactless payment device to a second patron of the venue.

One or more embodiments of the invention or elements thereof can be implemented in the form of a computer program product including a tangible computer readable recordable storage medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

In still another aspect, a computer program product includes a tangible computer readable recordable storage medium; the tangible computer readable recordable storage medium embodies computer usable program code configured such that, when executed by at least one hardware processor, the computer usable program code causes the at least one hardware processor to store first user preference information in a balance and preference database. The first user preference information is associated with a recyclable contactless payment device issued to a first patron of a venue. The computer usable program code also causes the at least one hardware processor to detect, after the first patron has used the contactless payment device at the venue, that the first patron has returned the recyclable contactless payment device for recycling and that the recyclable contactless payment device returned for recycling by the first patron is genuine; detect that a remaining balance exists and is to be disposed of in accordance with the first user preference information; deactivate the recyclable contactless payment device; dispose of the remaining balance of the recyclable contactless payment device in accordance with the preference information; and store second user preference information in the balance and preference database. The second user preference information is associated with the recyclable contactless payment device in connection with issue of the recyclable contactless payment device to a second patron of the venue.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
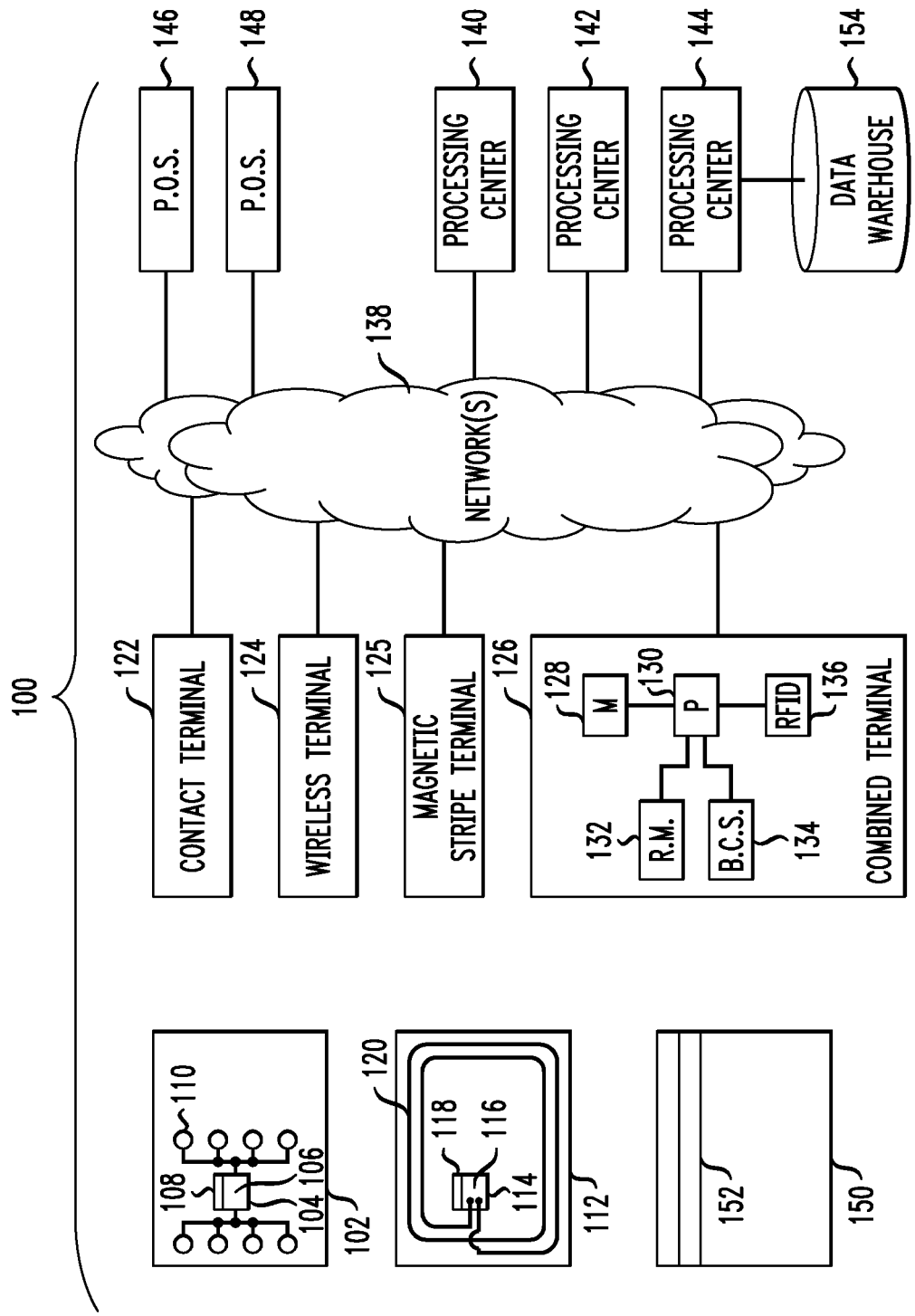
FIG. 1 shows an example of a system that can implement techniques of the present invention.

Attention should initially be given to FIG. 1, which depicts an exemplary embodiment of a system 100, according to an aspect of the present invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the invention. For completeness, note conventional card 150 having a magnetic stripe 152.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic techniques.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that, strictly speaking, the EMV specification defines the behavior of a terminal; however, the card can be configured to conform to such EMV-compliant terminal behavior and in this sense is itself EMV-compliant. It will also be appreciated that applications in accordance with the present invention can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

EMV Integrated Circuit Card Specifications for Payment Systems Book 1 Application Independent ICC to Terminal Interface Requirements Version 4.2 June 2008

EMV Integrated Circuit Card Specifications for Payment Systems Book 2 Security and Key Management Version 4.2 June 2008

EMV Integrated Circuit Card Specifications for Payment Systems Book 3 Application Specification Version 4.2 June 2008

EMV Integrated Circuit Card Specifications for Payment Systems Book 4 Cardholder, Attendant, and Acquirer Interface Requirements Version 4.2 June 2008

As noted, cards 102, 112 are examples of a variety of payment devices that can be employed with techniques of the present invention. Such devices could include cards having a conventional form factor, smaller or larger cards, cards of different shape, and the like. The cards, or other payment devices, can include body portions (e.g., laminated plastic layers of a payment card), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM). Cards or other devices could have a single interface (e.g., contacted, contactless, or magnetic stripe), or more than one interface (for example, both contacted and contactless). For completeness, note that appropriately configured cellular telephone handsets, and other devices, such as wristbands, discussed further below, can be used as contactless payment devices in some instances.

A number of different types of terminals can be employed with system 100. Such terminals can include a contact terminal 122 configured to interface with contact-type device 102, a wireless terminal 124 configured to interface with wireless device 112, or a combined terminal 126. For completeness, note magnetic stripe terminal 125 configured to interface with a magnetic stripe device 150. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device. Further details regarding one specific form of network will be provided below.

Many different retail or other establishments, represented by points-of-sale 146, 148, can be connected to network 138. Each such establishment can have one or more terminals. Further, different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of appropriate methods and techniques. The processor can perform such operations via hardware techniques, and/or under the influence of program instructions, such as an application, stored in one of the memory units.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. In some instances, the aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device. For completeness, note that magnetic stripe cards can be swiped in a well-known manner.

One or more of the processing centers 140, 142, 144 can include a database such as a data warehouse 154 for storing information of interest.

The description of devices, elements, or components 112, 114, 116, 118, 120 throughout this document are equally applicable to analogous aspects of unconventional contactless payment devices such as wrist bands or the like.

Figure 2:
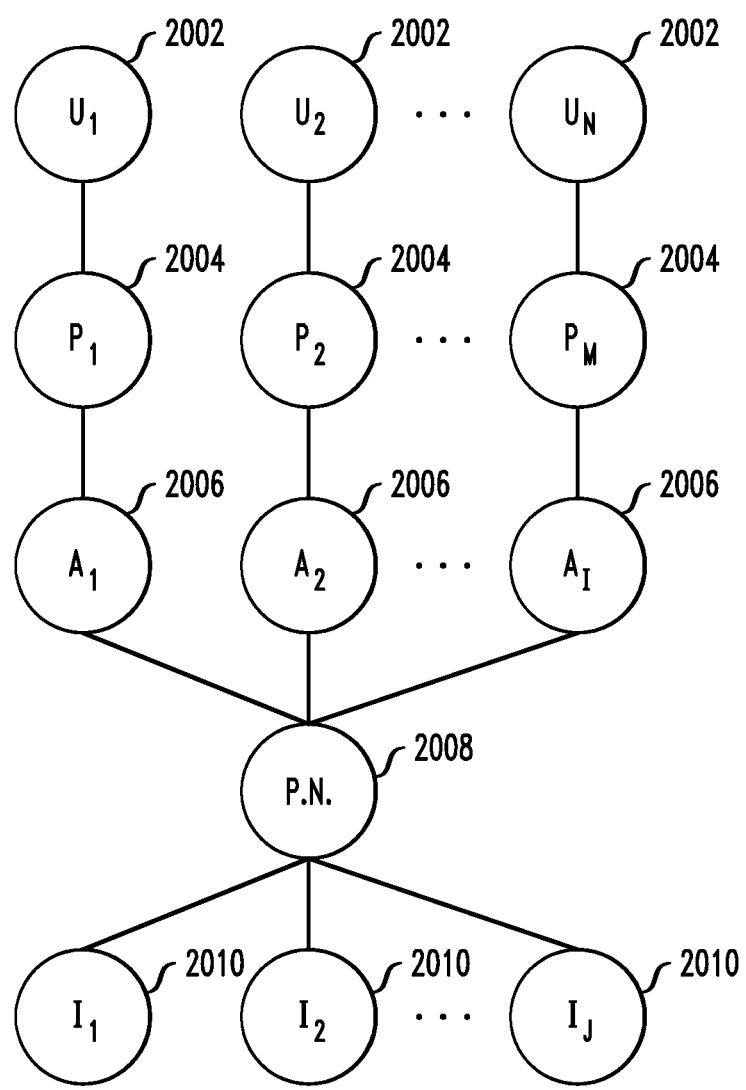
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through a single operator 2008 of a payment network (for example, a virtual private network (VPN)) configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal. Users 2002 could include, e.g., people attending an event. Merchants 2004 could include one or more parties staging an event; e.g., football teams or the like.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant (or checks against a demand deposit balance, in the case of a debit card, or checks against a balance stored on a server (for example, in the case of a prepaid card)). At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed with other kinds of payment networks, for example, proprietary or closed payments networks.

Some embodiments may be employed with payment systems such as EMV where some transactions may be authorized offline without the authorization request and response exchange with the issuer and these offline authorized transactions are also stored in "batches" which are later sent for clearing and settlement.

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

In chip based payment products, the total funds available to the cardholder can either be located on the card, which is ideal for off-line purchases, or can be located on the payment provider's server (the Issuer), which is ideal for on-line purchases. However depending where the funds are located, some functionality may not be available. For example, a preauthorized off-line card balance cannot be used for telephone or internet purchases. An on-line balance may not be ideal at merchant locations that cannot support high speed on-line authorizations or where fast throughput requirements favor offline transactions (for example, the entrance to a transit system such as an underground, metro, subway, or the like).

As used herein, an "on-line" transaction is one which undergoes a conventional authorization request and authorization response process, typically with the issuer (understood to also include an issuer processor acting on the issuer's behalf). The actual authorization provided back to the terminal may not come from the issuer; a third party may provide same on behalf of the issuer. Furthermore, an "off-line" transaction is one which does not undergo such a conventional process, but rather relies on local approval between the card and terminal, based on a balance stored on the card or the like; that is, the terminal seeks approval for the transaction from the card.

A contact transaction as referenced in the EMV payment standards is conducted with a card via a physical electrical connection to that card, typically, through a series of up to eight contacts. A contactless transaction as referenced in the EMV payment standards is conducted with a card via electromagnetic waves such as a radio signal, where no physical contact is required. Furthermore, a contact interface is defined in the ISO/IEC 7816 while a contactless interface is defined in ISO/IEC 14443 and/or in the NFC Standard. With regard to the latter, NFC was approved as an ISO/IEC standard on Dec. 8, 2003 and later as an ECMA standard. NFC is an open platform technology standardized in ECMA-340 and ISO/IEC 18092. The modulation schemes, coding, transfer speeds and frame format of the RF interface of NFC devices are specified in these standards, as are initialization schemes and conditions required for data collision-control during initialization—for both passive and active NFC modes. The standards also define the transport protocol, including protocol activation and data-exchange methods. Air interface for NFC is standardized in: ISO/IEC 18092/ECMA-340: Near Field Communication Interface and Protocol-1 (NFCIP-1) ISO/IEC 21481/ECMA-352: Near Field Communication Interface and Protocol-2 (NFCIP-2). All documents mentioned in this paragraph, including ISO IEC 7816, ISO/IEC 14443, and the complete suite of documents related to NFC, are expressly incorporated herein by reference in their entirety for all purposes.

Figure 3:
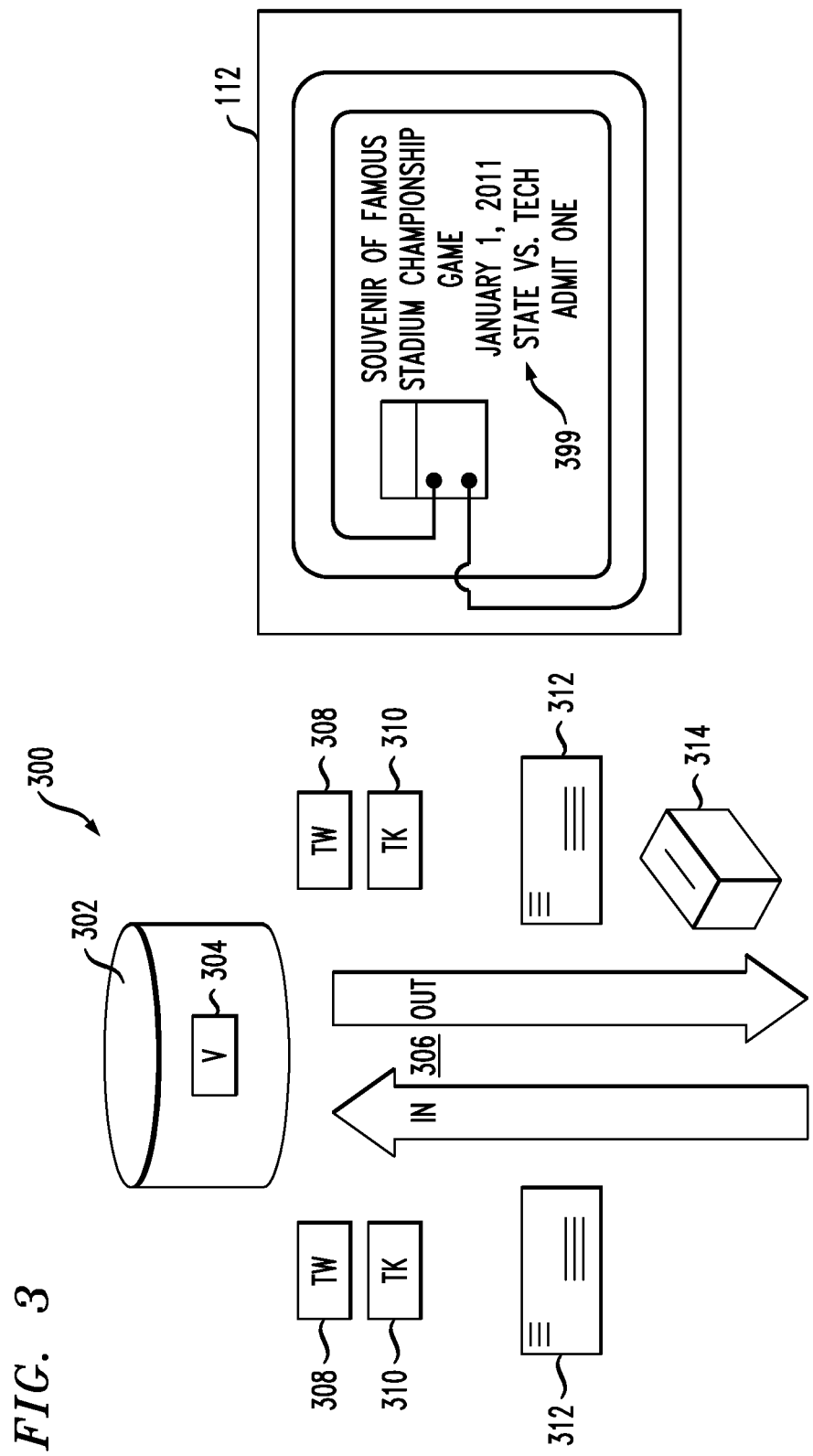
FIG. 3 shows an exemplary system, according to an aspect of the invention.
Figure 4:
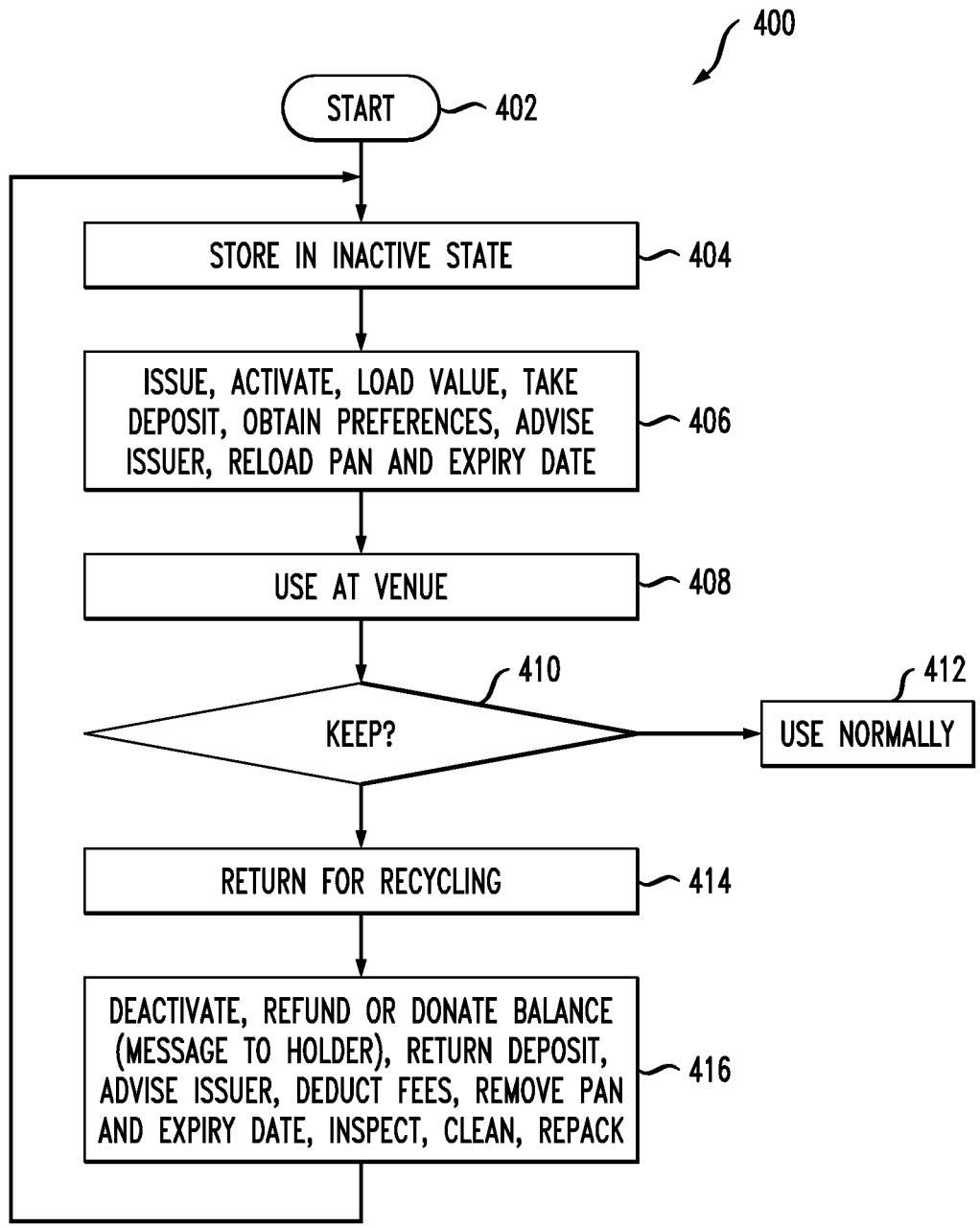
FIG. 4 is a flow chart of exemplary method steps, according to another aspect of the invention.

Reference should now be had to system diagram 300 of FIG. 3 and flow chart 400 of FIG. 4. In the flow chart, processing begins in step 402.

In one or more embodiments, a chip card solution is provided to sports and event venues 302 as a method to reduce the level of cash handling. If cards are issued only for use at a single event, the cost of issuing the card ($2 to $5) may be prohibitive. One or more embodiments encourage cardholders to return their cards on exit from the event, and the cards are then reused at the next event. This allows the card cost to be shared over a number of events, reducing the overall issuance cost per event. Entry to and exit from an event or venue are indicated by, respectively, "IN" and "OUT" arrows 306.

Embodiments of the invention enhance the viability of the temporary issuance of chip cards for use at a short duration event or venue, and may also be used, for example, at theme parks, hotels and resorts for the same purpose. A non-limiting example of such cards, with associated financial services, is the PAYPASS® smart card and associated financial services (registered mark of MasterCard International Incorporated, 2000 Purchase Street, Purchase, N.Y. 10577-2509 USA).

In general, in one or more embodiments, the card is in an inactive state while being stored and/or held ready for issuance at a kiosk (ticketing kiosk TK 310), ticketing agent (ticket window TW 308), or venue 302. See step 404. Cards may be issued, for example, at kiosk 310, agent 308, venue 302, by mail 312, and so on.

In one or more embodiments, as per step 406, at issuance, the card is enabled and any value required loaded onto the card. It is possible to take a deposit at this stage, and also any preferences for the return or use of funds when returned can be identified. This may include, for example:

Unused funds (including any deposit) returned to funding source (assuming it is not cash).

Unused funds (including any deposit) given to a charity.

Device not to be returned; rather, purchased for use as a general prepaid card.

Terms and conditions, and notification of any charges levied can be provided at this stage. In some instances, if funds are below a certain level, they are given to charity automatically when the device is returned.

In some instances, the cardholder is allowed to top up the card during the event if he or she runs low on funds. Use at the venue or event is shown at step 408.

On exit, the cardholder can return his or her card in a number of ways; see step 414:

At a manned ticket agent 308, especially if a cash refund is required.

At a kiosk 310.

Put in a large (preferably secure) hopper 314 on the way out.

Mail card back, as shown at 312.

Regardless of how the card is returned after the event, the deactivation process 416 will typically be the same in each case. Any funds remaining (plus any deposit) are refunded as per the agreed policy and/or cardholder preferences. The balance on the card is zeroed and the card is put back into an inactive state reader for re-use. A physical cleaning process for the returned card may also be undertaken.

It should be noted that when moved from active to inactive states, or visa versa, the issuer (or card manager) should receive conformation so that the issuer (or card manager) knows the exact state of the card stock. This process can, in some instances, also involve removing and/or re-loading the PAN and expiry date on each occasion.

One or more embodiments of the invention provide the potential for significant operational and/or commercial savings by introducing contactless payment systems to many venues and/or events which are currently cash dominated. In one or more embodiments, issue contactless payment products directly to those attending an event. Traditional issuance methods and products are not ideally suited to these environments, especially when the cardholder may only use an issued card for a few transactions within the venue or event before discarding it when he or she leaves. The issuance cost in such situations cannot be justified or recovered from transaction revenues. In one or more embodiments, introduce a deposit on issued cards, and re-use any cards returned (where the deposit is refunded) at subsequent events or venues, thus reducing issuance costs to an economic level.

The cost of issuing a chip card is the sum of a number of charges:

Manufacturing costs—the cost of making the physical card.

Personalization costs—the cost of encoding the chip, and so on.

Fulfilment costs—the cost of getting the card into the hands of the final cardholder.

If a card can be reused, then the manufacturing and possibly the personalisation costs can be shared over multiple issuances of the card. However this savings must be balanced against new costs introduced, such as those for collecting and recycling cards after an event. It is presently believed that the deposit should be set at a level (say, 3-5 US Dollars) to fully cover the card if it is not returned, while being low enough not to discourage attendees of the event. Cards which are returned should be reset, tested, cleaned and re-packed ready for re-use, thus saving the cost of purchasing new cards for every event (see step 416). If sufficient attendees keep and continue to use their cards, new revenue may also be available to the venue from the prepaid issuer for assisting the prepaid issuer in acquiring new customers. See decision block 410—users may opt to keep the card (right hand "YES" branch of block 410 leading to step 412, wherein the card is kept and used normally). If the card is to be returned (lower "NO" branch of block 410), steps 414 and 416 proceed as described.

It is desirable that card distribution can be undertaken alongside existing ticket delivery and/or fulfilment systems. This involves tickets being issued by ticket agents for fulfilment via the mail, face to face, and at unmanned kiosks. Anonymous prepaid chip cards can be made available to all customers, not just those which pass credit scoring. Cardholder information and/or preferences should however be captured (if possible) to allow the simple refund of any unused balance and deposit if the card is returned. As cards may be used multiple times, card artwork typically will not be specific to a single event (although in some cases, single-event artwork might be provided on the card for souvenir purposes). In some embodiments, depending on the deposit level, the venue may want to encourage users to keep cards by making them collectable. Instant issuance capabilities are highly desirable. It is presently believed unlikely that an Issuer's bank card personalisation and/or fulfilment bureau will be suitable for use within this market.

It is presently believed desirable that, where possible, the cardholder be given the confidence to load in advance more than sufficient funds for use at the venue and/or event. This can be undertaken, for example, when tickets are ordered, via a web portal after the card is received, or via cash at a retail store using one of the prepaid load networks. A non-limiting example of the latter is the MasterCard rePower™ Load Network, a service from MasterCard International Incorporated of Purchase, N.Y., USA, which allows adding money to eligible MasterCard or Maestro® prepaid cards at thousands of participating retailer locations (mark/registered mark of MasterCard International Incorporated of Purchase, N.Y., USA).

In some instances, cards may be promoted as a savings product, allowing the cardholder to save up for the event in the months preceding the event, by loading funds when money is available. In such cases, the card may not be enabled to spend the funds until the day(s) before the event. In EMV markets where funds may be held on the chip, systems should be provided at the venue to allow the chip to be updated. Within the venue, it should be possible to add additional funds onto the card, if required, using cash or other payment source. This may be undertaken at a kiosk or booth.

It is presently believed desirable that systems be implemented to allow funds to be transferred electronically from another account. This may be an auto load process, selected as part of the cardholder's preferences, or instigated from a mobile device (for example, a phone, text or web portal) using the original account used to fund the card balance.

Cards can be returned in a number of ways:

Thrown into a collection hopper 314 as a cardholder leaves the venue and/or event (automated refund based on defined preferences).

Inserted into a Kiosk 310 where the refund method may be selected; cash refund also possible.

Taken to manned ticket booth 308 where the refund method may be selected; cash refund also possible.

Mailed back to venue 302, as at 312, within a given time period following the event (retailers around the event can therefore also be encouraged to accept chip cards according to aspects of the invention).

It is believed desirable that it be convenient to return cards, and that the cost associated with doing so be reasonable. Collecting cardholder preferences in advance to allow the return and refund process to be automated is therefore desirable. However, some cardholders will wish to truly remain anonymous. Systems and services can be provided to allow cards, once returned, to be processed ready for reuse.

In one or more embodiments, when a card is returned by a cardholder, the following steps are undertaken:

On return of the card (preferably immediately), the cardholder is advised of the balance on the card. This may be, for example, via a display on the equipment, e-mail, or a text message sent to the customer's phone. See step 416.

The following tasks may then be undertaken immediately, or the card stored securely for batch processing at a later stage (e.g. after the event and/or venue has closed).

The remaining balance on the card is cleared with any funds remaining distributed according to scheme rules and/or cardholder preferences. Normally, unused funds will be returned to the cardholder after any fees are deducted. However, if the balance is below a minimum threshold, in some embodiments, no refund is made, and the funds instead are donated to charity, for example, to minimize costs. A message (email and/or text) may be sent to the cardholder to inform the cardholder that a refund has been made, and the amount refunded. See step 416.

The card will then be tested electronically to ensure it is fully functional, The card may then be cleaned before being visually inspected (possibly using an automated vision system) to ensure it has not become physically damaged or its appearance significantly degraded.

The card will then be deactivated to prevent use, and the organization managing the financial account advised so they can flag their systems accordingly. When re-issued, the card will be re-activated. This can be carried out via a cryptographically protected process, with the involvement of the issuer.

The card is then packed for storage until the next time it is required for issuance, as indicated by the return arrow from step 416 to prior to step 404.

In one or more embodiments, to allow the stadium and/or event market to go cashless, everyone attending needs access to contactless payments. For some, this will be a traditional contactless payment card already carried by the cardholder, such as a MasterCard® card or Maestro™ card, enabled with PayPass® technology (marks of MasterCard International Incorporated of Purchase, N.Y., USA); for everyone else, products that can be issued in advance, or at the venue by the event organizer and/or ticketing agent, are advisable.

In at least some instances, it is desired to remove cash from the venue. Thus, the loading or top-up of products, such as pre-paid payment cards is, in one or more embodiments, conducted outside the venue, or from another electronic payment source.

One significant aspect involves improving the speed of service at concession outlets (for example, vendor V 304 within the stadium 302); thus, due care should be undertaken when developing the acceptance infrastructure within a venue to ensure venue objectives are achieved. One or more embodiments provide the appeal of recycling, and environmentally friendly initiatives in general, in addition to operational savings for venues and/or events.

It is presently believed desirable that the fee structure around the use of the card be clearly identified (of course, all applicable rules and regulations regarding disclosure of fees and the like should be fully complied with). In some instances, cash loading may attract greater fees due to the costs levied by retail reload networks. In some cases, when refunding any unused balances, a fee may appropriately be charged, depending on the method used, and the type of refund given. Transaction, service, and/or ATM fees may also be applicable if the cardholder chooses to use the card outside the venue.

When selecting preferences, for small balances remaining on the card, an option may be given (or mandated) to donate the funds to charity. In most cases, the venue and/or event ticket and the recyclable payment card will be separate and not combined into a single product. However, in some instances, greater saving can be realized by combining the two products.

One or more embodiments include appropriate products, deployable infrastructure, commercial frameworks, and detailed positive business cases for all significant parties involved (payment network operator 2008, Issuer 2010, venue 302, vendors 304).

One or more instances of the invention may be used, for example, in one or more of stadiums, events, exhibitions, concerts, festivals and theme parks, to provide cost effective electronic payments solutions to minimize cash handling. Use of a well-known contactless payment method in these kinds of environments, such as the PayPass® solution, provides, in one or more instances, a number of significant advantages:

An increasing number of people attending in the future will likely carry their own bank-issued contactless payment card; thus, the number of cards a venue needs to issue will likely reduce over time.

Use of a well-known brand of contactless payment device provides people confidence to load funds onto the product in the knowledge that if they do not spend everything at the event, they can use the product in retail outlets until the funds are exhausted.

Through repower and other reload networks, funds can be loaded in advance of arriving at the venue and/or event, further reducing cash handling.

As part of a worldwide program, cards, terminals, acceptance and issuance infrastructure can be sourced from a wide range of independent vendors at competitive rates.

Contactless payment device acceptance, such as for the MasterCard PayPass® solution, enables a broad spectrum of contactless payment device solutions, including cards, wrist bands, key fobs, tickets, stickers and even payment-enabled mobile phones.

At present, contactless payment cards may not be widely enough held to limit all payments at an event or venue to this mode, without making cards available to those attendees who do not have their own. However using traditional bank products and issuance systems, this could be considered prohibitively expensive ($3 to $10), especially if cards are only used for a single event. Thus, recycling contactless payment cards provides, in one or more embodiments, a number of significant advantages over traditional products issued only once:

The cost of card production and personalization can be shared across a number of events, improving the overall business case for a venue and/or event organizer by reducing issuance costs.

This solution can be combined with other initiatives to result in an environmentally friendly, charitable event or venue.

For the venue, while encouraging cardholders to provide preference information to allow automated refunds when a card is returned, valuable customer relationship management (CRM) information can also be collected.

For the prepaid issuer, open loop contactless payment cards can be used as a customer acquisition tool promoting usage beyond any individual event or venue.

Instant issuance systems may be provided in one or more embodiments to allow venues and ticket agents to personalize and load value onto these products.

A significant use of contactless payment cards is as a cash replacement product, to provide improved cardholder convenience, faster merchant throughput, and efficiency savings. As with many such new technologies, a challenge to rapid mass adoption is balancing the issuance of cards and installation of acceptance locations. In closed environments such as stadiums, events, exhibitions, concerts, festivals and theme parks, it is possible to control both card issuance and acceptance locations. It is believed that such locations can benefit from a cashless environment.

One or more embodiments make use of existing anonymous prepaid payment cards, such as PayPass cards using PayPass Mag-Stripe or PayPass MChip profiles. Appropriate rules and agreements for the issuance of these cards to multiple cardholders (recycling) can be provided. For example, in some cases, existing licences may assume a card will only be issued to one cardholder; such may need to be amended in order to obtain issuance revenue each time a recycled card is issued, if appropriate.

In some instances, a card may be personalized only once, and a fixed PAN and expiry date may be maintained during its whole life; in other cases, these may need to be changed each time a card is issued. In one or more embodiments, after a card is returned, it is put into an inactive state while awaiting re-issuance. In at least some cases, appropriate limitations should be implemented on the card and/or card account to prevent a cardholder setting up post dated transactions that will potentially be charged to a future cardholder.

Another non-limiting exemplary use of one or more embodiments allows transit operators the ability to offer occasional customers cost effective fare media.

It should be noted that in one or more embodiments, for a payment device, issuer scripting can be used to physically undertake the adjustment of the offline balance. Issuer scripting is per se known to the skilled artisan; given the teachings herein, the skilled artisan will be able to employ issuer scripting to implement one or more embodiments of the invention.

In another aspect, when a card is returned for recycling, instead of the holder getting his or her money back, he or she can request that a permanent card be issued to him or her (for example, instantly or by mail) with the balance transferred onto the permanent card. This aspect provides, for example, a useful way of moving a consumer from an anonymous card to a fully personalized card (with his or her name on it). Additional advantages include the opportunity for the holder to obtain a new card if the temporary card is worn or scuffed, and/or the opportunity to obtain a "real" card usable outside the venue, if the holder was originally issued a wrist band, or paper ticket. This aspect works on the basis, that if the holder had a good experience, he or she may now want to sign up to a permanent card, and not want to just keep the original temporary card that was issued. This aspect may, in at least some instances, involve an additional fee; however, by returning (or not returning) the original card, the holder may get a discount off the full price as he or she has already paid a deposit.

In some instances, as part of the preferences for a holder (for example, when the temporary card is initially applied for or returned), the holder may specify that rather than getting a refund, a new personalized card may be issued at a kiosk or via mail. Thus, the temporary card may be returned or retained as a souvenir, and a new card obtained. If the balance is an on-line balance only, the old card can be left with the holder and used until the new card arrives, and then deactivated. In sum, the relationship with the holder can be retained after the event ends. The fee for the new card may be adjusted to recognize the deposit paid (in some instances, even if the temporary card is not returned).

In still another aspect, in many instances, companies do not obtain payment directly from the consumer, but act through a third party intermediary. This is quite common, for example, in vending machine scenarios. In many situations, the event or venue, although it may accept credit and/or debit cards, may have no access whatsoever to the card data. To comply with PCI DSS (Payment Card Industry Data Security Standard) rules promulgated by the PCI Security Standards Counsel, many organizations incorporate credit and/or debit acceptance into their systems as a "black box." Using this approach, such organizations only know that the payment they asked for has been successfully undertaken, and normally they are given a reference number for the transaction. Such aspects address concerns regarding avoiding improper use of stored expiry data, card numbers, and the like.

The PCI DSS Version 1.2, launched Oct. 1, 2008, together with all prior versions, are expressly incorporated herein by reference in their entirety for all purposes (although the skilled artisan will already be familiar with same per se). The same are available from the web site of the PCI Security Standards Counsel.

When a refund is required (e.g., when a card is returned for recycling), the event or venue (e.g., vending machine company) will therefore not know the details of the card to return the funds to. It may therefore be necessary for the venue or event to work with the venue's or event's credit and/or debit solution provider, to allow such provider to undertake a refund based on the aforementioned reference number (e.g., "reference number 75," it being understood that the actual number might be longer and more complex, "75" merely being an example). The venue or event will not know the actual card or card number, only the reference number and the fact that payment has been obtained. Accordingly, the reference number must be used in connection with the credit and/or debit solution provider to provide the refund.

In yet another aspect, if the balance on a card that has been returned for recycling has been loaded from various funding sources, to meet local banking rules and/or laws, it may be necessary to limit any refund to the value actually loaded from that funding source. This may require extra intelligence in the refund system, and explicit rules detailed in the terms and conditions. By way of a non-limiting example, "John" loads his card three times during an event. First, "John" loads his temporary card with $50, using his credit card, when he first collects his temporary card. Second, "John" loads his temporary card with $100, using cash during the event. Third, "John" loads his temporary card with $25, using his debit card, during the event. At the end of the event, he has $55 left on the card when he returns the card for recycling. Local banking rules and/or laws should be consulted to determine which account the funds are to be returned to. In some instances, the refund may need to be split between two or more cards or accounts. Furthermore, where a third party provider is employed, as described above, only a reference number and not actual card data may be available. In such cases, the refund procedure may set forth in the terms and conditions. For example, the maximum amount allowable may be refunded to the last funding card or account, then the next last, and so on (or vice versa). Of course, terms and conditions should comply with applicable laws and rules, and then be followed.

Given the discussion thus far, it will be appreciated that, in general terms, an exemplary method, according to an aspect of the invention, includes the step, as discussed, for example, in connection with block 406, of issuing a recyclable contactless payment device to a first patron of a venue 302. The device can be a card of traditional or nontraditional form factor, a wrist band, key fob, ticket, sticker, or other type of contactless payment device. Additional steps include, as discussed, for example, in connection with block 408, facilitating the first patron using the contactless payment device at the venue; and as discussed, for example, in connection with block 414, facilitating the first patron returning the contactless payment device for recycling. Further steps, as discussed, for example, in connection with blocks 416, the return arrow from block 416 to block 404, and block 404 include deactivating and storing the contactless payment device; and repeating the issuing and facilitating using steps for at least a second patron of the venue, with the recyclable contactless payment device.

In some instances, in association with the issuing step 406, user preference information is collected from the first patron; and in association with the deactivating step 416, a remaining balance of the recyclable contactless payment device is disposed of in accordance with the preference information (e.g., donated to a charity, refunded to one or more funding accounts, or the like).

In some instances, as will be discussed further below in connection with FIG. 5, an additional step includes providing a system including distinct software modules embodied on at least one tangible computer readable recordable storage medium. The modules include a return detection module, a refund module, a balance and preference database module, and a deactivation module. In the step of collecting the user preference information, the user preference information is stored in the balance and preference database module, and at least a portion of the balance and preference database module executes on at least one hardware processor (e.g., an engine to search records in a data store). Additional steps include detecting, with the return detection module executing on the at least one hardware processor, that the first patron has returned the recyclable contactless payment device for recycling and that the recyclable contactless payment device returned for recycling by the first patron is genuine; and detecting, with the refund module executing on the at least one hardware processor and interfacing with the balance and preference database module, that the remaining balance exists and is to be disposed of in accordance with the user preference information. The step of deactivating the recyclable contactless payment device can be carried out, for example, using the deactivation module executing on the at least one hardware processor; and the step of disposing of the remaining balance of the recyclable contactless payment device in accordance with the preference information can be carried out, for example, using the refund module executing on the at least one hardware processor.

In some instances, the storing step 404 further includes removing a first account number and a first expiry date from the recyclable contactless payment device, and the repeated issuing step 406 includes associating a second expiry date and a second account number with the recyclable contactless payment device.

In one or more embodiments, an additional step includes offering the recyclable contactless payment device to the first patron in connection with marketing an event at the venue. In some cases, the recyclable contactless payment device further comprises a ticket to the event.

Another optional feature includes affording a patron an opportunity for periodic planned loads of value associated with the recyclable contactless payment device prior to the event (for example, "saving up" to have spendable funds to enjoy at the event).

Yet another optional feature includes offering a patron an opportunity to convert the recyclable contactless payment device to a permanent, personalized payment card. In some cases, venue 302 charges a fee to an issuer of the permanent, personalized payment card for helping to secure a new cardholder. In some cases, the issuer of the permanent, personalized payment card charges the patron a fee for the conversion. Note that "conversion" does not necessarily imply a physical change in the recyclable contactless payment device but also providing the permanent, personalized payment card (the recyclable contactless payment device could be deactivated and discarded, deactivated and retained as a souvenir or the like, or deactivated and re-issued to another patron, for example). In some cases, an additional step includes applying at least a portion of a deposit paid by the second patron in association with the recyclable contactless payment device against the fee for the conversion. Furthermore, in some cases an additional step includes, in association with the repeated issuing step, collecting user preference information from the second patron. The user preference information might include for example, an indication of a desire of the patron for the conversion or, in another aspect, a desire to retain and use the recyclable contactless payment device upon leaving the venue.

As noted, in some cases, the recyclable contactless payment device is formed as a souvenir of the venue and/or an event at the venue (e.g., with suitable lettering and/or artwork thereon). Furthermore, in some cases, in association with the deactivating step, the patron is advised of a remaining balance associated with the recyclable contactless payment device, and/or the remaining balance of the recyclable contactless payment device is disposed of (in some cases, for example, where required by local authority, to two or more funding accounts; in some cases, for example, when a third party is employed, by providing a reference number to a third party provider).

FIG. 3 shows card 112 with lettering 399 which functions as a souvenir of both the venue ("Famous Stadium") and the event (Jan. 1, 2011 championship game between State and Tech). Card 112 also functions as a ticket to admit one fan to the event, as also shown at 399.

As also noted, patrons may be afforded an opportunity to top up the balance of the recyclable contactless payment device within the venue (and/or before attending an event at the venue).

Given the discussion thus far, it will be appreciated that, in general terms, an exemplary apparatus, according to another aspect of the invention, and as will be discussed further below in connection with FIG. 5, includes a memory 1630, a network interface, and at least one processor 1620, coupled to the memory and the network interface. Also included are a plurality of distinct software modules embodied on at least one tangible computer readable recordable storage medium; for example, a return detection module, a refund module, a balance and preference database module, and a deactivation module. The distinct software modules, when loaded into the memory, cause the at least one processor to be operative to carry out or otherwise facilitate any one, some, or all of the method steps described herein. For example, in some instances, the distinct software modules, when loaded into the memory, cause the at least one processor to be operative to store first user preference information in the balance and preference database module. The first user preference information is associated with a recyclable contactless payment device issued to a first patron of a venue. Furthermore, in some instances, the distinct software modules, when loaded into the memory, cause the at least one processor to be operative, after the first patron has used the contactless payment device at the venue, to detect, by executing the return detection module and by communication over the network interface, that the first patron has returned the recyclable contactless payment device for recycling and that the recyclable contactless payment device returned for recycling by the first patron is genuine; to detect, by executing the refund module interfacing with the balance and preference database module, that a remaining balance exists and is to be disposed of in accordance with the first user preference information; to deactivate the recyclable contactless payment device by executing the deactivation module; to dispose of the remaining balance of the recyclable contactless payment device in accordance with the preference information by executing the refund module; and to store second user preference information in the balance and preference database module. The second user preference information is associated with the recyclable contactless payment device in connection with issue of the recyclable contactless payment device to a second patron of the venue.

In some cases, the distinct software modules, when loaded into the memory, further cause the at least one processor to be operative to remove a first account number and a first expiry date from the recyclable contactless payment device by executing the deactivation module; and associate a second expiry date and a second account number with the recyclable contactless payment device in connection with the issue of the recyclable contactless payment device to the second patron of the venue.

As noted elsewhere, the second user preference information can, for example, indicate that the second patron wishes to convert the recyclable contactless payment device to a permanent, personalized payment card; or indicate that the second patron wishes to retain and use the recyclable contactless payment device upon leaving the venue.

Given the discussion thus far, it will be appreciated that, in general terms, an exemplary computer program product, according to another aspect of the invention, and as will be discussed further below in connection with FIG. 5, includes a tangible computer readable recordable storage medium. The tangible computer readable recordable storage medium embodies computer usable program code configured such that, when executed by at least one hardware processor, the computer usable program code causes the at least one hardware processor to carry out or otherwise facilitate any one, some, or all of the method steps described herein; for example, to store first user preference information in a balance and preference database. The first user preference information is associated with a recyclable contactless payment device issued to a first patron of a venue. Additional steps that the computer usable program code can cause the at least one hardware processor to carry out or otherwise facilitate include, after the first patron has used the contactless payment device at the venue, to detect that the first patron has returned the recyclable contactless payment device for recycling and that the recyclable contactless payment device returned for recycling by the first patron is genuine; to detect that a remaining balance exists and is to be disposed of in accordance with the first user preference information; to deactivate the recyclable contactless payment device; to dispose of the remaining balance of the recyclable contactless payment device in accordance with the preference information; and to store second user preference information in the balance and preference database. The second user preference information is associated with the recyclable contactless payment device in connection with issue of the recyclable contactless payment device to a second patron of the venue. In the most general case, the computer usable program code may or may not be organized into modules and/or sub-modules as described elsewhere herein.

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126, a reader 132, a host, server, and/or processing center 140, 142, 144 (optionally with data warehouse 154) of a merchant, issuer, acquirer, processor, program manager or other third party, or payment processing network operator, and the like. Firmware might be employed, for example, in connection with payment devices such as cards 102, 112.

Figure 5:
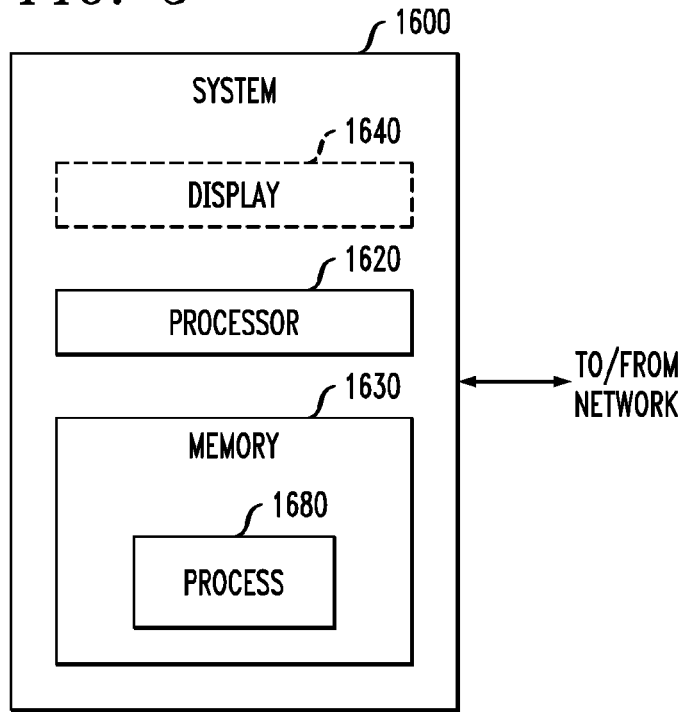
FIG. 5 is a block diagram of an exemplary computer system useful in one or more embodiments of the present invention.

FIG. 5 is a block diagram of a system 1600 that can implement part or all of one or more aspects or processes of the invention. As shown in FIG. 5, memory 1630 configures the processor 1620 (which could correspond, e.g., to processor portions 106, 116, 130, processors of remote hosts in centers 140, 142, 144, processors of a local server at a venue or event, and the like) to implement one or more aspects of the methods, steps, and functions disclosed herein (collectively, shown as process 1680 in FIG. 9). Different method steps can be performed by different processors. The memory 1630 could be distributed or local and the processor 1620 could be distributed or singular. The memory 1630 could be implemented as an electrical, magnetic or optical memory, or any combination of these or other types of storage devices (including memory portions as described above with respect to cards 102, 112). It should be noted that if distributed processors are employed, each distributed processor that makes up processor 1620 generally contains its own addressable memory space. It should also be noted that some or all of computer system 1600 can be incorporated into an application-specific or general-use integrated circuit. For example, one or more method steps could be implemented in hardware in an ASIC rather than using firmware. Display 1640 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium which stores data in a non-transitory fashion, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on elements 102, 112, 122, 124, 125, 126, 140, 142, 144, a server at a venue or event, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network. Local processing capability may be provided on a local area network (LAN) at a venue or event.

Thus, elements of one or more embodiments of the present invention, such as, for example, the aforementioned terminals 122, 124, 125, 126, processing centers 140, 142, 144 with data warehouse 154, or payment devices such as cards 102, 112 can make use of computer technology with appropriate instructions to implement method steps described herein. By way of further example, a terminal apparatus 122, 124, 125, 126, 702 could include, inter alia, a communications module, an antenna coupled to the communications module, a memory, and at least one processor coupled to the memory and the communications module and operative to interrogate a contactless payment device (in lieu of, or in addition to, the antenna and communications module, appropriate contacts and other elements could be provided to interrogate a contact payment device such as a contact card or read a magnetic stripe). Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 1600 as shown in FIG. 5) running a server program. It will be understood that such a physical server may or may not include a display, keyboard, or other input/output components. A "host" includes a physical data processing system (for example, system 1600 as shown in FIG. 5) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can correspond to appropriate blocks or steps in the figures. The method steps can then be carried out using the distinct software modules of the system executing on the one or more hardware processors. Further, a computer program product can include a tangible computer-readable recordable storage medium with code adapted to be executed to carry out one or more method steps described herein, including the provision of the system with the distinct software modules.

Figure 6:
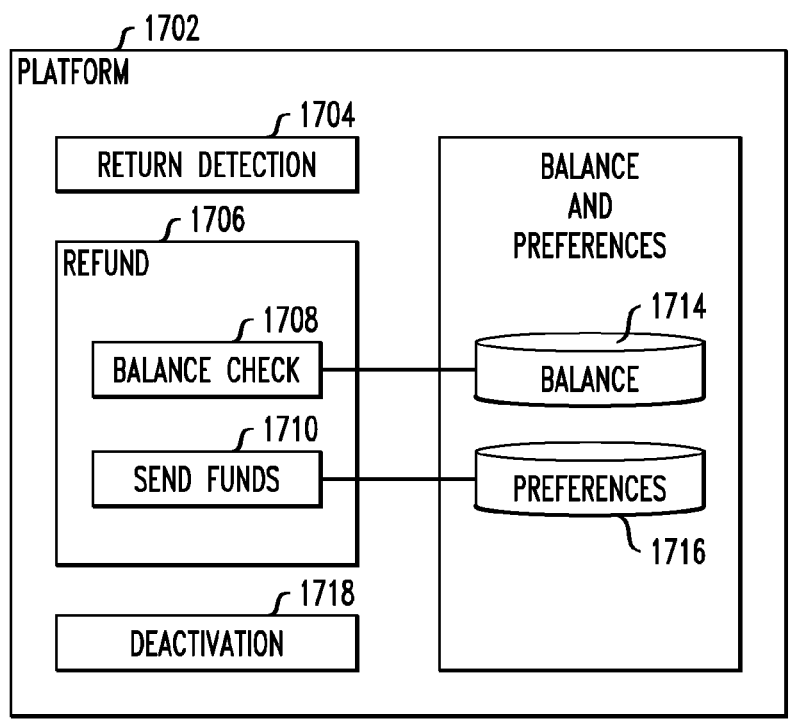
FIG. 6 shows modules of an exemplary platform, in accordance with one or more embodiments of the disclosure.

In one or more embodiments, one or more software modules reside on a server of a program manager, issuer, and/or issuer processor. It should be noted that in one or more embodiments, a card is changed back and forth between active and inactive states. With reference to FIG. 6, non-limiting exemplary components include a first module 1704 to determine that a card has been returned and that it is genuine (e.g., via suitable cryptographic techniques); a second module 1708 to determine if there are funds available to be refunded or otherwise redistributed; a first database 1714 connected to the second module and containing a record of available funds, and a second (or preference) database 1716 connected to the second module and containing a record of cardholder preferences and/or terms and conditions of the card. These preferences may be set, for example, when the temporary card is first provided to the holder, and may optionally be updated upon return of the temporary card or otherwise. The second module (or another module) may be configured to determine how to refund or otherwise distribute any remaining funds. An additional module 1718 zeroes out the card value and deactivates the card, and another module 1710 effectuates the refund (preferably after the card is deactivated, to avoid having the remaining balance exist in two places at once).

Thus, exemplary modules include a return detection module 1704, a refund module 1706, a balance and preference database module 1712, and a deactivation module 1718. The collected user preference information can be stored in said balance and preference database module 1712 (e.g., in preference database 1716). The balance can be stored in balance database 1714. The balance checking and funds sending functions 1708, 1710 could be separated if desired. The databases 1714, 1716 can be combined or separate. The modules can, for example, be part of a platform 1702 running on a server of a program manager, issuer, or issuer processor; for example, at a processing center 142. Communication with a physical contactless device may be, for example, over a network 138, 2008, via a terminal or reader as shown in FIG. 1 and network interface as shown in FIG. 5, using issuer scripting and/or other suitable commands, messages, and/or protocols. The modules and sub-modules can also run on different servers at the same or different locations controlled by the same or different entities.

Computers discussed herein can be interconnected, for example, by one or more of network 138, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
issuing a recyclable contactless payment device to a first patron of a venue;
facilitating said first patron using said contactless payment device at said venue;
facilitating said first patron returning said contactless payment device for recycling;
deactivating and storing said contactless payment device;
in association with said issuing, collecting user preference information from said first patron;
in association with said deactivating, disposing of a remaining balance of said recyclable contactless payment device in accordance with said preference information;
providing a system, said system in turn comprising distinct software modules stored in a non-transitory manner on at least one tangible computer readable recordable storage medium, said modules comprising a return detection module, a refund module, a balance and preference database module, and a deactivation module, wherein, in said step of collecting said user preference information, said user preference information is stored in said balance and preference database module, at least a portion of said balance and preference database module executing on at least one hardware processor;
detecting, with said return detection module executing on said at least one hardware processor, that said first patron has returned said recyclable contactless payment device for recycling and that said recyclable contactless payment device returned for recycling by said first patron is genuine;
detecting, with said refund module executing on said at least one hardware processor and interfacing with said balance and preference database module, that said remaining balance exists and is to be disposed of in accordance with said user preference information;
wherein:
said step of deactivating said recyclable contactless payment device is carried out using said deactivation module executing on said at least one hardware processor; and
said step of disposing of said remaining balance of said recyclable contactless payment device in accordance with said preference information is carried out using said refund module executing on said at least one hardware processor; and
repeating said issuing and facilitating using steps for at least a second patron of said venue, with said recyclable contactless payment device.

2. The method of claim 1, wherein said storing further comprises removing a first account number and a first expiry date from said recyclable contactless payment device, and wherein said repeated issuing step comprises associating a second expiry date and a second account number with said recyclable contactless payment device.

3. The method of claim 1, further comprising offering said recyclable contactless payment device to said first patron in connection with marketing an event at said venue.

4. The method of claim 3, wherein said recyclable contactless payment device further comprises a ticket to said event.

5. The method of claim 3, further comprising affording said first patron an opportunity for periodic planned loads of value associated with said recyclable contactless payment device prior to said event.

6. The method of claim 1, further comprising offering said second patron an opportunity to convert said recyclable contactless payment device to a permanent, personalized payment card.

7. The method of claim 6, further comprising said venue charging a fee to an issuer of said permanent, personalized payment card.

8. The method of claim 6, further comprising an issuer of said permanent, personalized payment card charging said second patron a fee for said conversion.

9. The method of claim 8, further comprising applying at least a portion of a deposit paid by said second patron in association with said recyclable contactless payment device against said fee for said conversion.

10. The method of claim 6, further comprising, in association with said repeated issuing, collecting user preference information from said second patron, said user preference information comprising at least an indication of a desire for said conversion.

11. The method of claim 1, further comprising forming said recyclable contactless payment device as a souvenir of at least one of said venue and an event at said venue.

12. The method of claim 1, further comprising, in association with said repeated issuing, collecting user preference information from said second patron, said user preference information comprising at least an indication of a desire to retain and use said recyclable contactless payment device upon leaving said venue.

13. The method of claim 1, further comprising, in association with said deactivating step, advising said first patron of a remaining balance associated with said recyclable contactless payment device.

14. The method of claim 1, further comprising the additional step of, in association with said deactivating, disposing of a remaining balance of said recyclable contactless payment device to at least two funding accounts.

15. The method of claim 1, further comprising the additional step of, in association with said deactivating, disposing of a remaining balance of said recyclable contactless payment device by providing a reference number to a third party provider.

16. The method of claim 1, further comprising the additional step of affording said first patron an opportunity to top up a balance of said recyclable contactless payment device within said venue.

17. A non-transitory apparatus comprising:
means for issuing a recyclable contactless payment device to a first patron of a venue;
means for, in association with said issuing, collecting user preference information from said first patron;
means for storing said user preference information and a remaining balance of said recyclable contactless payment device, wherein said means for storing excludes said recyclable contactless payment device;
means for facilitating said first patron using said contactless payment device at said venue;
means for facilitating said first patron returning said contactless payment device for recycling;
means for deactivating and storing said contactless payment device;
means for, in association with said deactivating, refunding said remaining balance of said recyclable contactless payment device in accordance with stored said user preference information; and means for repeating said issuing, facilitating using, and facilitating returning steps for at least a second patron of said venue, with said recyclable contactless payment device;

wherein said apparatus excludes a transmission medium and disembodied signal.

18. An apparatus comprising:
a memory;
a network interface;
at least one processor, coupled to said memory and said network interface; and
a plurality of distinct software modules stored in a non-transitory manner on at least one tangible computer readable recordable storage medium, said modules comprising a return detection module, a refund module, a balance and preference database module, and a deactivation module;
wherein said distinct software modules, when loaded into said memory, cause said at least one processor to be operative to:
store first user preference information in said balance and preference database module, said first user preference information being associated with a recyclable contactless payment device issued to a first patron of a venue;
after said first patron has used said contactless payment device at said venue, detect, by executing said return detection module and communication over said network interface, that said first patron has returned said recyclable contactless payment device for recycling and that said recyclable contactless payment device returned for recycling by said first patron is genuine;
detect, by executing said refund module interfacing with said balance and preference database module, that a remaining balance exists and is to be disposed of in accordance with said first user preference information;
deactivate said recyclable contactless payment device by executing said deactivation module;
dispose of said remaining balance of said recyclable contactless payment device in accordance with said preference information by executing said refund module; and
store second user preference information in said balance and preference database module, said second user preference information being associated with said recyclable contactless payment device in connection with issue of said recyclable contactless payment device to a second patron of said venue.

19. The apparatus of claim 18, wherein said distinct software modules, when loaded into said memory, further cause said at least one processor to be operative to:
remove a first account number and a first expiry date from said recyclable contactless payment device by executing said deactivation module; and
associate a second expiry date and a second account number with said recyclable contactless payment device in connection with said issue of said recyclable contactless payment device to said second patron of said venue.

20. The apparatus of claim 18, wherein said second user preference information indicates that said second patron wishes to convert said recyclable contactless payment device to a permanent, personalized payment card.

21. The apparatus of claim 18, wherein said second user preference information indicates that said second patron wishes to retain and use said recyclable contactless payment device upon leaving said venue.

22. A computer program product comprising a tangible computer readable recordable storage medium, said tangible computer readable recordable storage medium embodying computer usable program code stored thereon in a non-transitory manner and configured such that, when executed by at least one hardware processor, said computer usable program code causes said at least one hardware processor to:
store first user preference information in a balance and preference database, said first user preference information being associated with a recyclable contactless payment device issued to a first patron of a venue;
after said first patron has used said contactless payment device at said venue, detect that said first patron has returned said recyclable contactless payment device for recycling and that said recyclable contactless payment device returned for recycling by said first patron is genuine;
detect that a remaining balance exists and is to be disposed of in accordance with said first user preference information;
deactivate said recyclable contactless payment device;
dispose of said remaining balance of said recyclable contactless payment device in accordance with said preference information; and
store second user preference information in said balance and preference database, said second user preference information being associated with said recyclable contactless payment device in connection with issue of said recyclable contactless payment device to a second patron of said venue.

* * * * *